(12) United States Patent
Hayes et al.

(10) Patent No.: US 7,777,870 B2
(45) Date of Patent: *Aug. 17, 2010

(54) METHOD AND SYSTEM FOR THE RECOGNITION OF AN OPTICAL SIGNAL

(75) Inventors: James C. M. Hayes, Hormer, NY (US); Luis A. Sanchez, Albany, NY (US); Eva Marie Sackal, Altamont, NY (US); Clinton T. Ballinger, Burnt Hills, NY (US)

(73) Assignee: Evident Technologies, Inc., Troy, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/017,102

(22) Filed: Jan. 21, 2008

(65) Prior Publication Data

US 2008/0205052 A1    Aug. 28, 2008

Related U.S. Application Data

(63) Continuation-in-part of application No. 11/866,974, filed on Oct. 3, 2007.

(60) Provisional application No. 60/874,066, filed on Dec. 12, 2006.

(51) Int. Cl.
*G01J 3/00* (2006.01)
(52) U.S. Cl. ........................................................ 356/51
(58) Field of Classification Search .................. 356/51, 356/432
See application file for complete search history.

(56) References Cited

U.S. PATENT DOCUMENTS

| 4,345,840 | A | * | 8/1982 | Goetz et al. | 356/407 |
|---|---|---|---|---|---|
| 5,751,429 | A | * | 5/1998 | Wada et al. | 356/418 |
| 5,822,029 | A | | 10/1998 | Davis et al. | |
| 6,403,947 | B1 | * | 6/2002 | Hoyt et al. | 250/226 |
| 2005/0224703 | A1 | * | 10/2005 | Harada et al. | 250/226 |
| 2008/0137067 | A1 | * | 6/2008 | Sanchez et al. | 356/51 |
| 2008/0205052 | A1 | * | 8/2008 | Hayes et al. | 362/231 |

FOREIGN PATENT DOCUMENTS

| EP | 881057434 | 8/1989 |
|---|---|---|
| JP | 11316405 | 11/1999 |
| KR | 1020000075127 | 12/2000 |

OTHER PUBLICATIONS

PCT International Search Report and Written Opinion dated Apr. 21, 2008.
Sanchez et al., U.S. Appl. No. 11/866,974, Office Action Communication, 11739/108 (EVID-0004), Dec. 15, 2009, 6 pages.

* cited by examiner

*Primary Examiner*—Roy Punnoose
(74) *Attorney, Agent, or Firm*—Hoffman Warnick LLC (57) ABSTRACT

A system and method for distinguishing a first light source from other light sources utilizes an image receiver that can selectively engage and disengage a filter. The filter can be configured to block bands of light corresponding to the light being emitted by either the first source or the other sources. By alternately engaging and disengaging the filter from the image receiver, the first light source may be distinguished from other light sources.

28 Claims, 6 Drawing Sheets

METHOD AND SYSTEM FOR THE RECOGNITION OF AN OPTICAL SIGNAL

CROSS-REFERENCE TO RELATED APPLICATIONS

The present application is a continuation-in-part of co-pending U.S. patent application Ser. No. 11/866,974, filed Oct. 3, 2007, which claims the benefit of U.S. Provisional Patent Application No. 60/874,066, filed Dec. 12, 2006, each of which is incorporated herein by reference.

FIELD OF THE INVENTION

The present invention relates to a method and system for transmitting and receiving light and more particularly to a method and system where an image receiver can distinguish between multiple light sources.

BACKGROUND OF THE INVENTION

Various kinds of lights are commonly used for assistance and guidance. For example, white lights on cars can be used to illuminate roads in low light or no light conditions, and colored lights on traffic signals can be used to deliver information such as whether a driver should stop or proceed. Lights can also be used to identify locations such as in the case of the lights used to illuminate a bridge as well as to identify the presence of a moving object such as in the case of automobile break lights. Numerous analogous uses of lights can also be found in a myriad of other industries and applications.

At times when there are multiple light sources it can sometimes be difficult to decipher the significance of any one particular light source. For example, if the city street lights or lights used to illuminate a street sign are red, then it can be confusing for a driver to determine which lights serve as a signal to stop and which are merely used to identify the location of a sign or a street. Additionally, a plurality of light sources might be able to identify a plurality of locations or objects, but those sources cannot provide any information regarding individual locations or objects within that plurality. For example, when driving at night, headlights and break lights can make automobiles visible, but they cannot give any additional information about individual automobiles such as whether the vehicle is a police car or whether the vehicle has a certain level of security clearance.

Based on the foregoing limitations of current lighting systems, it would, therefore, be desirable to design a lighting system and/or lighting system components that can deliver more information than lighting systems currently known in the art, and to utilize such systems and components to detect and/or distinguish light sources.

BRIEF DESCRIPTION OF THE INVENTION

A system embodying aspects of the present invention can include a first light source having a first spectrum and an image receiver that can discriminate between the first light source and other light sources. The first light source might emit light over a broadband spectrum and utilize one or more optical filters, absorbers, or reflectors to selectively modify the wavelength bands, altering the spectrum of the transmitted light. Alternatively the first light source may have a unique spectrum from other light sources and not require further spectral modification via filters, absorbers, or reflectors.

The transmitted light can be detected by an image receiver outfitted with an optical filter. The second optical filter can be selectively chosen to be in optical communication with the first light source. For example, the receiving filter might exhibit a reflection and/or absorption spectrum that corresponds to the transmission spectrum of the first light source. When the receiving filter is engaged with the image receiver, the first light source can be blocked whereas other light sources without a modified spectrum can be transmitted through the receiving optical filter and observed by the image receiver. When the receiving filter is not engaged, the first light source and the other light sources may all be observed. Thus by alternatively engaging and disengaging the receiving optical filter, the first light source may be distinguished from the other observable light sources.

Another aspect of the present invention can include having the receiving filter exhibit a transmission spectrum that corresponds to the transmission spectrum of the first light source. When the receiving filter is engaged, the first light source can be transmitted to the image receiver whereas light sources that are spectrally distinct from the first light source (e.g., those without a modified spectrum or with a spectrum modified differently than the first light source) can be reflected or absorbed. When the receiving filter is not engaged with the image receiver, the first light source and the other light sources may all be observed. Thus by alternatively engaging and disengaging the receiving optical filter, the first light source may be distinguished from the other observable light sources.

Another aspect of the present invention can include having one portion of the spectrum of the first light source provide illumination while another portion of the spectrum of the first light source may have a unique or altered spectrum allowing for it to be distinguished from other light sources.

DETAILED DESCRIPTION OF THE INVENTION

A system embodying aspects of the present invention can include a first light source having a first spectrum and an image receiver that can discriminate between the first light source and other light sources.

Figure 1:
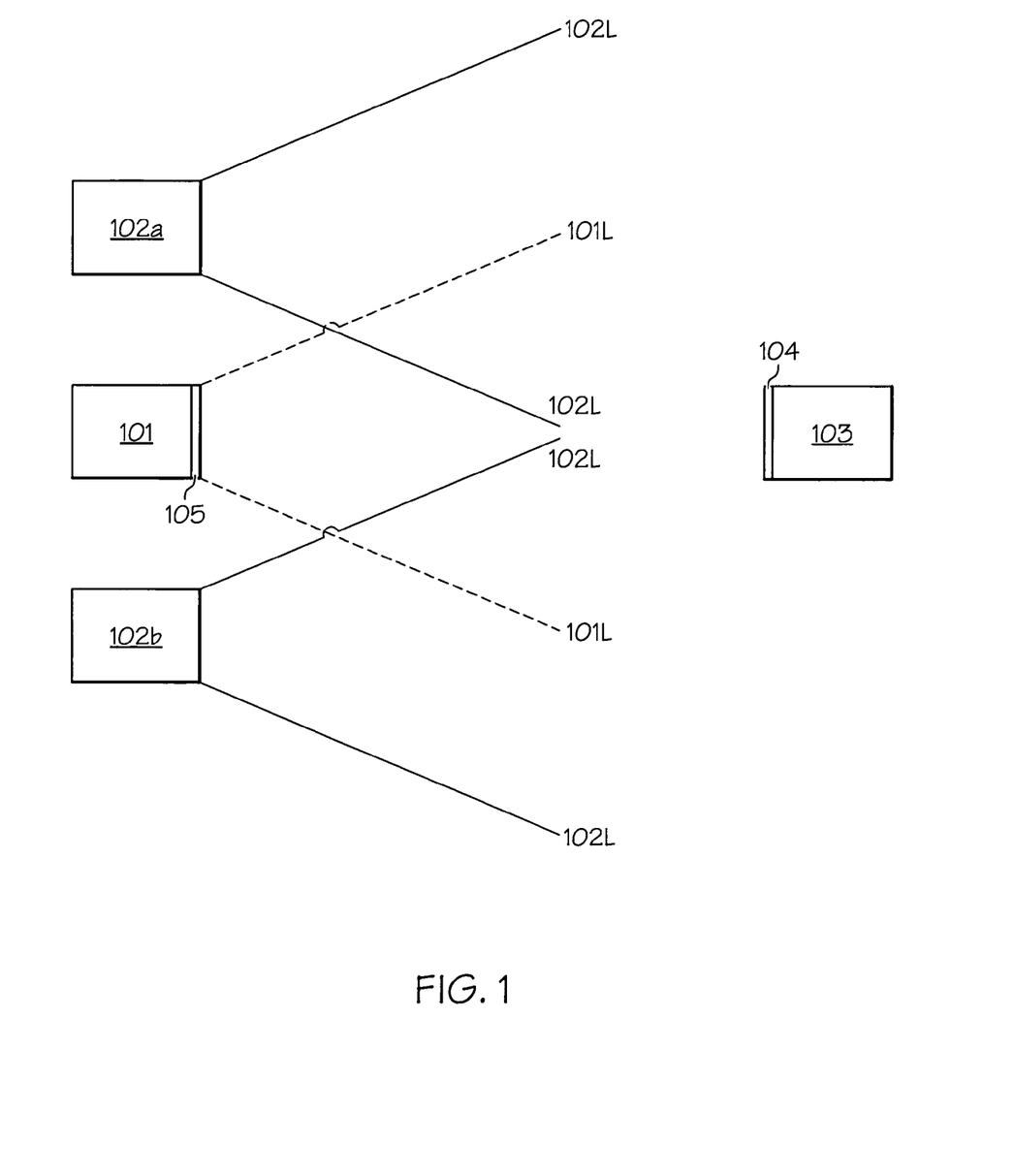
FIG. 1 is an example of a system embodying aspects of the present invention.

FIG. 1 schematically depicts an exemplary operation of a system embodying aspects of the present invention. The system can include a first light source 101 for producing light (shown by dotted lines 101L) over a first spectrum of wavelengths and an image receiver 103 (i.e., a detecting device) capable of distinguishing the light 101L produced by the first source 101 from light 102L produced by other light sources 102a-b. The first light source 101 might transmit light 101L over a broadband spectrum and utilize a first optical filter or series of filters (also referred to as a transmitting filter) (shown by element 105) to selectively absorb or reflect back one or more wavelength bands, thereby altering the spectrum of the transmitted light 101L. The image receiver 103 can manually, mechanically, or electronically engage a second optical filter 104 (also referred to as a receiving filter). When the image receiver 103 engages the second optical filter 104, certain bands of light can be absorbed or reflected while other bands can pass through the filter 104 to the image receiver 103. When the second optical filter 104 is not engaged, the image receiver 103 will receive all light being transmitted, including light from the first light source 101 as well as the other sources 102a-b, and the first light source 101 might be indistinguishable from other light sources 102a-b by the image receiver 103. As used herein, the term "light" shall mean a broad range of the electromagnetic spectrum from infrared (IR; about 12 μm to about 750 nm) through ultraviolet (UV; about 400 nm to about 1 nm). Similarly, "light source" shall mean a single light source or a plurality of light sources used in combination.

The second optical filter 104 can be configured to reflect or absorb light at one or more wavelength bands (stopbands) corresponding to the wavelength bands emitted by the first light source 101. In these instances, the other light sources 102a-b can emit at wavelengths that are removed from the spectrum of the first light source 101 by the first optical filter 105. For example, the first and second light sources 101 and 102 might emit in the full visible spectrum (roughly 400 nm to 700 nm). The first optical filter 105 might be configured to remove the wavelength band from 400 nm to 550 nm from the light 101L emitted by the first light source 101, only allowing light in the band from 550 nm to 700 nm to be transmitted. Thus, if the second optical filter 104 is configured to reflect or absorb light of wavelengths ranging from 550 nm to 700 nm, then none of the light 101L emitted by the first light source 101 will be transmitted to the image receiver 103, while the 400 nm to 550 nm band of the other light sources 102a-b will pass through the second optical filter 104 and be detected by the image receiver 103. Therefore, the image receiver 103 will be able to detect the other light sources 102a-b but not the first light source 101 when the second optical filter 104 is engaged. When the second optical filter 104 is not engaged, both the first light source 101 and the other light sources 102a-b will be detectable by the image receiver 103. Thus, by alternately engaging and disengaging the second optical filter 104, the first light source 101 and other light sources 102a-b can be distinguished from one another.

In an alternative embodiment, rather than removing a portion of the visible spectrum from the first light source 101, the first optical filter 105 might remove a portion of the non-visible spectrum. Thus, the first and other light sources 101 and 102a-b might look indistinguishable to the human eye but still be distinguishable by the image receiver 103.

In the embodiment described above, the image receiver 103 can distinguish between the first light source 101 and other light sources 102a-b by alternatively filtering and not filtering all or a portion of the light spectrum emitted by the first light source 101. In an alternative embodiment, the image receiver 103 can distinguish between the first light source 101 and other light sources 102a-b by alternatively filtering and not filtering all or a portion of the light spectrum emitted by the other light sources 102a-b. For example, the other light sources 102a-b might emit in the portion of the visible spectrum from 500 nm to 700 nm while the first source 101 emits over the entire visible spectrum (approximately 400 nm to 700 nm). Thus, if the second optical filter 104 is configured to reflect or absorb light of wavelengths ranging from 500 nm to 700 nm, then none of the light 102L emitted by the other light sources 102a-b will be transmitted to the image receiver 103, while the 400 nm to 500 nm band of the first light source 101 will pass through the second optical filter 104 and be detected by the image receiver 103. Therefore, the image receiver 103 will be able to detect the first light source 101 but not the other light sources 102a-b when the second optical filter 104 is engaged. When the second optical filter 104 is not engaged both the first light source 101 and the other light sources 102a-b will be detectable by the image receiver 103. Thus, by alternately engaging and disengaging the second optical filter 104, the first light source 101 and other light sources 102a-b can be distinguished from one another. In yet another embodiment, one or both of the wavelength and the intensity of wavelength bands emitted by the first light source 101 may be modulated in synchrony with one or both of the image receiver 103 and the second optical filter 104.

Another aspect of the present invention can include having the first light source 101 emit in both the visible and infrared portions of the spectrum, as many white lights naturally do. The first light sources 101 can provide illumination in the visible portion of the spectrum and can provide information, such as identification information in the infrared portion of the spectrum. The first optical filter 105 can modify the infrared portion of the spectrum of the light 101L emitted from the first light source 101, and the image receiver 103 can be configured to detect both the visible and infrared portion of the spectrum. Thus, when the optical filter 104 on the image receiver 103 is not engaged, a user of the system will see only the visible light being produced by all light sources. However, when the optical filter 104 is engaged, the user of the image receiver 103 will be able to distinguish between the light sources because some will be emitting infrared light and others will not.

Another aspect of the present invention can include having the first light source 101 emit in both the visible and infrared portions of the spectrum, as many white lights naturally do. The first light sources 101 can provide illumination in the visible portion of the spectrum and can provide information, such as identification information in the infrared portion of the spectrum. The first optical filter 105 need not be used if the source 101 is configured in such a way as to transmit light 101L that has a modified infrared component of the spectrum, and the image receiver 103 can be configured to detect both the visible and infrared portion of the spectrum. Thus, when the optical filter 104 on the image receiver 103 is not engaged, a user of the system will see only the visible light being produced by all light sources. However, when the optical filter 104 is engaged, the user of the image receiver 103 will be able to distinguish between the light sources because some will be emitting infrared light and others will not.

Another aspect of the present invention can include applying the first filter 105 to the first source of light 101 in such a way that the emitted infrared light carries digital information, such as an identification number. For example, the portion of the infrared spectrum between 1000 nm to 9000 nm might be divided into 8 bits such that 1000 nm to 2000 nm is the first bit, 2000 nm to 3000 nm is the second bit, and so on. Based on the configuration of the filter used, some ranges will emit lights and other will not (i.e. some bits will be "on" and some will be "off"). Emitting within the range corresponding to a bit might de characterized as an "on" or "1" while not emitting within a range might correspond to an "off" or a "0." For example, if it is known that the lights on ambulances do not emit light between 1000 nm to 2000 nm, 3000 nm to 4000 nm, and 6000 nm to 7000 nm but emit in the other portions of the infrared spectrum, then it might produce a digital identifier of 01011011. An image receiver 103 might include a series of filters configured to isolate the wavelength ranges corresponding to each bit. For example, a filter corresponding to the first bit might only transmit light in the band from 1000 nm to 2000 nm, a filter corresponding to the second bit might only transmit light in the band from 2000 nm to 3000 nm, and so on. Therefore, a user of the image receiver 103 can confirm the digital identifier produced by the ambulance by seeing whether each bit is a 0 or 1. Other types of vehicles such as police cars and fire trucks might each have different, unique 8-bit identifiers.

It is contemplated that a system embodying aspects of the present invention is not limited in the types of applications in which it might be implemented. For example, an image receiver 103 might take the form of any detecting device, such as a camera system, night vision goggles, or other display devices such as monitors or location instrumentation. Likewise, the first light source 101 might be implemented into devices such as automobiles or other transportation devices, personal lights attachable to the human body, identification lights such as those used to illuminate a road or runway, or virtually any other type of light emitting system known in the art. In any embodiment of the invention, one or both of the first light source and the image receiver (detecting device) may be mobile, e.g., coupled to a vehicle.

Nonlimiting examples of light sources include broadband light sources such as incandescent lights, halogen lights, deuterium, xenon, or metal halide arc lamps or other light sources with a unique spectrum such as sulfur lamps, mercury vapor lamps, ceramic metal halide lamps, fluorescent lights, sodium vapor lamps, light emitting diodes, white light LEDs employing Ce:YAG or other phosphors, RGB multichip LEDs, lasers etc. Also, light sources with absorbing and/or reflecting optical components that result in an emitted spectrum that is modified from the traditional broad emissive characteristics of the aforementioned light sources may be used. Nonlimiting examples of optical filters include polarizers (linear and circular) interference filters (bandpass, long, pass, short pass, hot and cold mirrors etc.), plasma filters, frequency selective surfaces, photonic band gap materials, glass color filters, polymers or gels containing dyes or pigments. The filters may be affixed or unaffixed to a light source or an image receiver. The image receiver may be manually, mechanically, or electrically engage or disengage a single filter or a plurality of filters.

Nonlimiting examples of image receivers 103 include a camera connected to a display monitor, a pair of glasses, or any other common detection device to which a filter might be fixedly or non-fixedly attached, applied, or interposed. Additionally, infrared detection equipment including infrared cameras, night vision goggles (NVGs), other night optical devices (NODs) sensitive to infrared (IR) wavelengths as well as visible wavelengths can be used as image receivers for detecting near IR wavelengths (approximately >750 nm) that are otherwise undetectable by the unaided eye.

Nonlimiting examples of first optical filters 105 and second optical filters 104 include interference filters comprising dielectric and or thin metal film stacks deposited on a glass or plastic substrates, or dyes, pigments or other absorbing materials dispersed within or on the surface of polymer, glass, or gel films, plates, or other optical substrates. The first optical filter 105 may be in the form of lenscaps, covers, mirrors (hot and cold mirrors), tunable optical filters, tunable Lyot filters, liquid crystal tunable thin film filters, or other optical system in which the first light derived from the first light source 101 may be passed through. The first optical filter can be eliminated in the event the light source 101 is configured in such a way as to modify the spectrum via reflective optical components. The second optical filter 104 may take the form of lenscaps, standard optical filters, or eyeglasses that may be manually, mechanically, or electronically engaged with the image receivers 103.

Filters for the first light 101 source and the image receiver 103 can be made from any combination of absorbing materials such as thin film molded parts incorporating absorbing dyes and pigments. The filter 105 for the light source 101 might commonly be produced by incorporating different concentrations of absorbing dyes into extruded films and/or injection molded parts. Alternatively, interference filters comprising stacks dielectric and dielectric/metal films known in the art can be used. Filters 104 for the image receiver 103 can be produced by absorbing materials or other techniques such as interference filters, etc. Many of these filters are sensitive to the angle of incidence of the incoming light so the spectral transmittance can vary with the incident angle of light. The light source filter and the detection filters need to be complementary in order to form an optical lock and key. There are many examples of filters that could be used. Any filters that block one or multiple signals in the UV, visible or infrared spectrum can be employed. An exemplary interference filter might be what is known as a hot mirror. This type of filter is designed specifically to reflect IR and transmit the visible light. Filters on the light source can be made according to the below described procedures. Multiple layers of films can be added to get the correct optical density of absorbing materials.

Exemplary methods of producing an absorbing film are disclosed below. Parameters, such as the quantities of chemicals, amounts of time, and temperatures used as well as the selection of chemicals and various procedures performed can all be altered without deviating from the spirit of the present invention.

To prepare a polymer film with IR and UV absorbing dyes, thin films of polystyrene, polycarbonate, and PMMA can be made that are optically clear. IR absorbing dyes can be incorporated into these films. It has been found that a concentration of approximately 0.54% total dye in polymer can work well for the purposes of the present invention. UV absorbing dyes can be incorporated in the PS-IR films as well.

An example method of making a PMMA film of the present invention is described below. PMMA films of varying thickness with a constant concentration 20.008 g of PMMA (Mw=350,000 Aldrich) are dissolved in approximately 100 mL of dichloromethane. To this solution 0.025 g Epolin 4105, 0.026 g Epolin 4138, 0.029 g Epolin 3130, and 0.025 g Epolin 1125 are added after being dissolved in dichloromethane. Epolin dyes block the transmission of certain portions of the near infrared spectrum. Next aliquots of 4.5, 9.0, 13.5, and 18.0 mL of the polymer/dye solution are removed and placed in aluminum trays to dry. In order to slow the drying process, trays of the resulting material can be covered with small funnels. The final average dye concentration might be 1.3 mg dye/g polymer or 5.25 mg/total dye/g polymer. An increase in film thickness can improve the effectiveness of the film as an infrared wavelength blocker. After drying, the thickness of the films can be determined using a modified Mitutoyo Absolute ID-S 1012 instrument. The effectiveness of the films can also be determined by using NVGs with an attached 890 nm shortpass filter. Results of such are located in the table below.

In another embodiment, the following dye mixture may be employed, the percentages being a weight/weight percentage of the polymer/dye solution: 0.148% Green A1 dye (Bis (dithiobenzil)nickel), 0.148% Green BI (Bis(dithioanisil) nickel), 4.44% Thermoplast Gelb 104 (BASF), and 0.022% Valifast Red 3306 (Orient Corp. of America).

A second example method of preparing a polymer film with IR and UV absorbing dyes is described below. The chemicals used and described below are abbreviated as follows; Polystyrene (PS), Poly methyl methacrylate (PMMA), Glaze Coat Epoxy (Part A and Part B), Envirotex Lite Pour-on High Gloss Finish, Epolin 1125, Epolin 1175, Epolin 4105, Epolin 4138, Epolin 4139, Tinuvin® 292, Tinuvin® 328, Tinuvin® 770 DF, Tinuvin® 5060, Lowite 5060, and Dichloromethane.

| Sample | Volume Added (mL) | Film Thickness (mm) | Effectiveness Rating |
|---|---|---|---|
| 26-A2 | 4.5 | 0.27 | 4 |
| 26-B2 | 9.0 | 0.4 | 3 |
| 26-C2 | 13.5 | 0.63 | 2 |
| 26-D2 | 19.0 | 0.66 | 1 |

The polymer films are made with various concentrations of absorbing dyes as follows. 2.5 g of PMMA is dissolved in $CH_2Cl_2$. A solution of 0.5% absorbing dye (Epolin 4105) and 0.5% 4138 in $CH_2Cl_2$ is prepared and the required amount is added to make concentrations of 0.05, 0.01, 0.005, and 0.001% of each dye. The resulting solution is then mixed. Two films are then prepared. One film is a thin film and the other film is a thicker film. The films are allowed to dry in air in an aluminum dish. The optical clarity of the films can then be observed after drying. The films formed are optically clear.

In addition to preparing thin films containing absorbing dye (Epolin 4105), thin films may be prepared with various concentrations of Epolin absorbing dyes 4138 and 4139 as follows. 5.0 g of PMMA is dissolved in approximately 30 mL of $CH_2Cl_2$. A solution of 0.5% 4138 and 0.5% 4139 in $CH_2Cl_2$ is prepared and the required amount is added to make concentrations of 0.05 and 0.01% of each dye. Two films of different thicknesses are then prepared, one thin and the other thick, and allowed to dry in air. Each resulting thin film is substantially optically clear.

Another example of polystyrene films is prepared after placing them in a vacuum chamber. These films are prepared as follows. 5.0 g of PS is dissolved in approximately 30 mL of $CH_2Cl_2$. Next a solution of 0.5% Epolin 4105 and 0.5% Epolin 4138 is added and mixed. Part of the solution is placed into an aluminum dish and then placed in the vacuum chamber to remove the solvent. The optical clarity of the resulting films is substantially free of bubbles and is optically clear. Other films might contain some bubbles but can still be optically clear.

Infrared absorbing dyes can be made in different epoxies as follows. Equal parts of epoxy are placed in a centrifuge along with various amounts of 0.5% Epolin 4105 and 0.5% Epolin 4138 dye solution in chloroform. This is mixed for approximately 3 minutes and then placed in metal or plastic containers. These samples are then placed in the vacuum chamber with no heat until no bubbles are observed. The heat can be raised to approximately 120° C. for approximately one hour. The samples can be removed and the film can be observed. If heat is applied before all the chloroform is removed, bubbles might be present in the final film. However, in the event that the chloroform is removed under vacuum, bubbles should not be present in the final film and the films should be substantially optically clear.

An example of infra-red absorbing dyes in optically clear glaze coat epoxy can be prepared as follows. 2 mL of Part A and 2 mL of Part B of the above mentioned Glaze Coat epoxy is mixed for approximately 3 minutes. Epolin dye solution is added so that 0.25, 0.5, 0.75, and 1.0 mL of dye at 0.5% 4105 and 0.5% 4138 solution is present. The mixture is mixed and then added to various molds. The different molds can then either be placed in an oven or placed under a vacuum to produce films.

Figure 2:
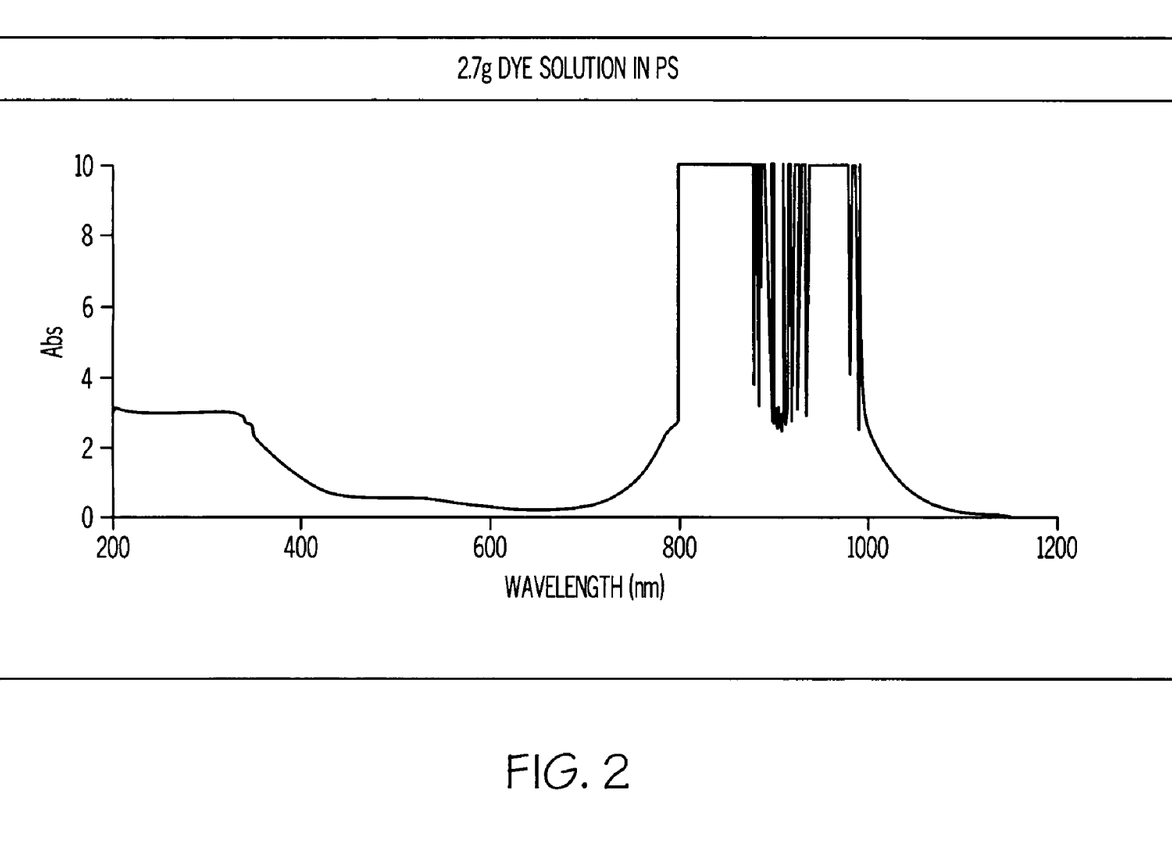
FIG. 2 is an example of a broadband light source and the filtered spectrum.

A thin film of polystyrene with a concentration of 1% Epolin 4105 and 1% Epolin 4138 can then be prepared as follows. 10.0 g of PS is dissolved in approximately 60 mL of $CH_2Cl_2$. 0.9 g increments of the dye solution are then be added (for example, 5 additions total). After each addition, approximately 3 mL of the solution is removed and placed into an aluminum dish. This dish is then covered with a styrofoam cup with the bottom removed to dry. The resulting films are substantially optically clear. FIG. 2 shows the UV-Visible spectrum of the film prepared after the 3rd addition, 2.7 g of solution is added. As can be readily seen in FIG. 2, this film can strongly absorb wavelengths between 800 nm and 1000 nm.

Two polystyrene films can be prepared such that they may be placed on or around the headlight of a vehicle. These polystyrene films can be prepared using 3.6 g of Epolin 4105 and 4138 dye solution. Two 10.0 g samples of PS dissolved in $CH_2Cl_2$ can be prepared. Next, 3.6 g of the 1% 4105 and 1% 4138 dye solution can be added and then mixed. These solutions can then be added to two aluminum containers of different sizes in a desired form. The containers can be placed under funnels and allowed to dry. The resulting solution can both absorb the desired wavelengths of light and be optically clear.

Figure 3:
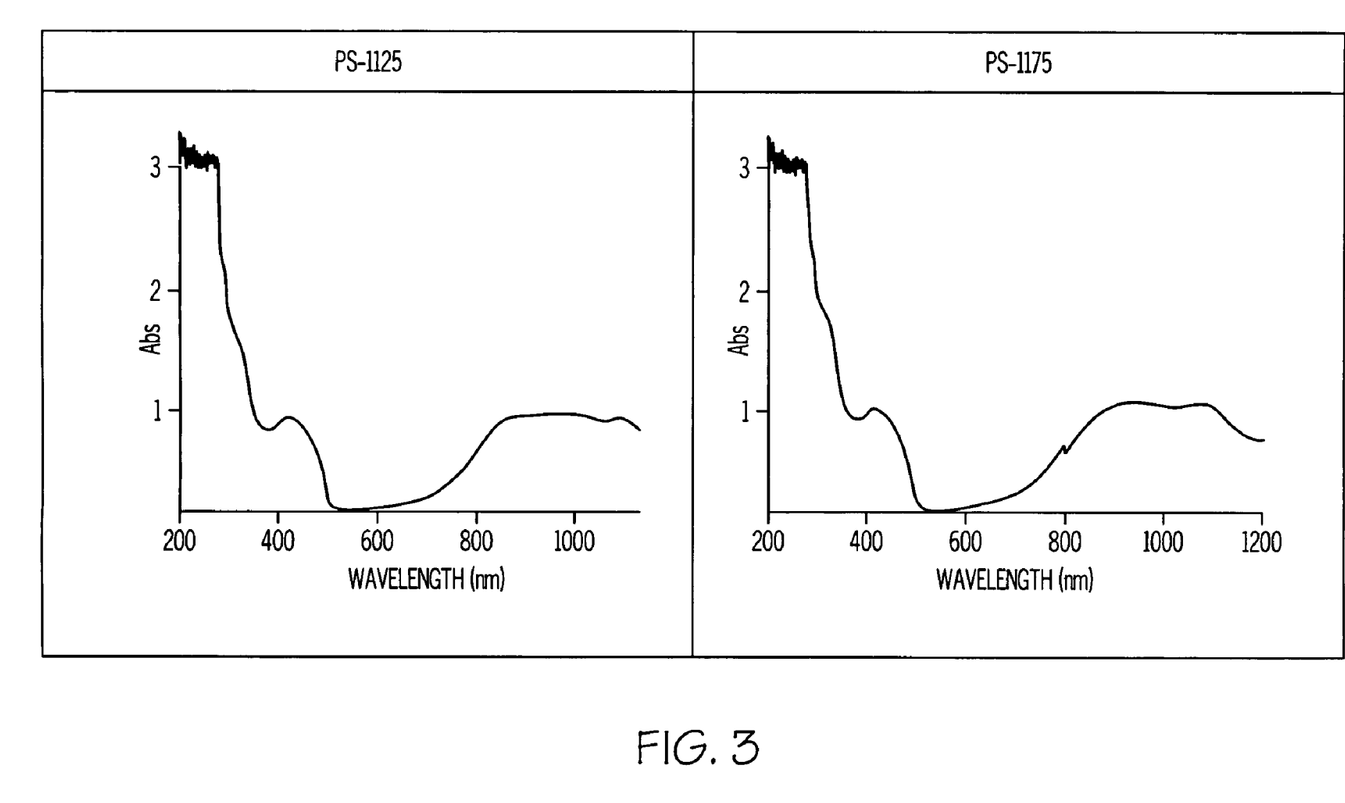
FIG. 3 shows the light incident upon a detector from the filter of FIG. 1.
Figure 4:
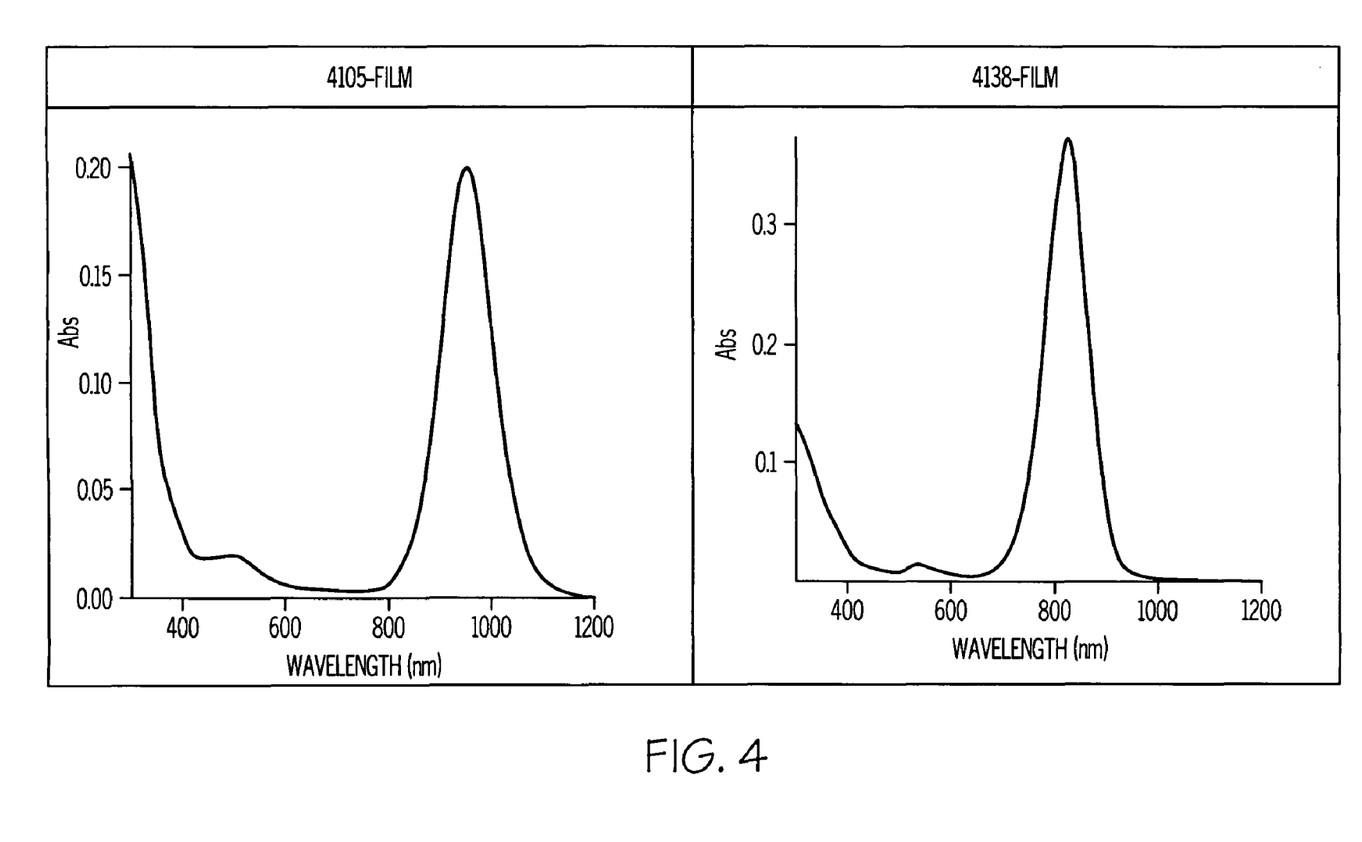
FIG. 4 is the UV-Visible Spectrum of an IR absorbing thin film according to an embodiment of the present invention.
Figure 5:
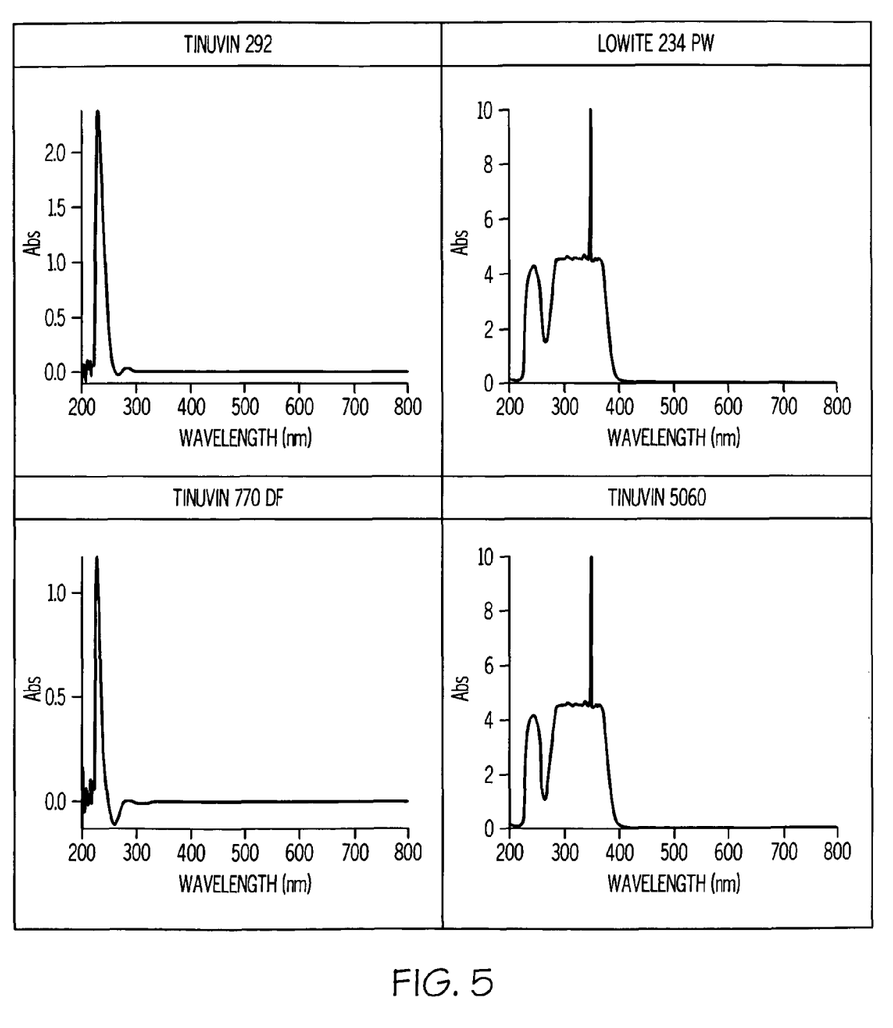
FIG. 5 is the UV-Visible Spectrum of thin films made from Epolin 1125 and Epolin 1175.

Two polystyrene films containing Epolin 1125 and Epolin 1175 dye can be prepared as follows. Two 10.0 g samples of PS dissolved in $CH_2Cl_2$ are prepared. Next, 2.7 g of either 1% Epolin 1125 or 1% Epolin 1175 dye solution is added. Then, approximately 3 mL of the solution is placed in an aluminum dish and allowed to dry under a styrofoam cup funnel. Both solutions form optically clear films. The resulting UV-Vis Spectra of each film are shown in FIG. 3. As can be seen in FIGS. 4 and 5, the IR absorbance of the Epolin 1125 and Epolin 1175 is not as great as with the Epolin 4105 and Epolin 4138.

Two polystyrene films of Epolin 4105 and Epolin 4138 can be prepared with UV absorbers to prevent degradation as follows. A 5% solution of each UV blocker can be prepared in $CH_2Cl_2$. Next, a 1:100 dilution can be made and the UV-Vis spectrum obtained. The spectrums of these films are represented in FIG. 4 and compared to that of Epolin 1125 and 1175 above. Next four thin films can be cast using Tinuvin® 292, 770 DF, 5060, and Lowite 234 PW at 4.0 g of the 5% solution. The UV-Vis can be taken for these resulting films (see FIG. 5). The UV-Vis of the 2.7 g solution is also present for comparison of the UV absorbance. The UV absorbers 234 PW and 5060 can absorb much of the UV from 200-400 nm while the absorbers 292 and 770 DF only absorb a narrow range around 250 nm. The addition of the first three absorbers to the film can increase the absorbance around the 400 nm portion without increasing the total absorbance in the UV region. It should be noted that these films may also be formed via spin coating, melt extrusion, or other deposition methods suitable for a polymeric carrier and a spectrum-blocking dye formulation.

With respect to the thin films of polystyrene it is apparent that these films can be made that are optically clear. Additionally, IR absorbing dyes can be incorporated into these films and UV absorbing dyes can be incorporated in the PS-IR films.

Figure 6:
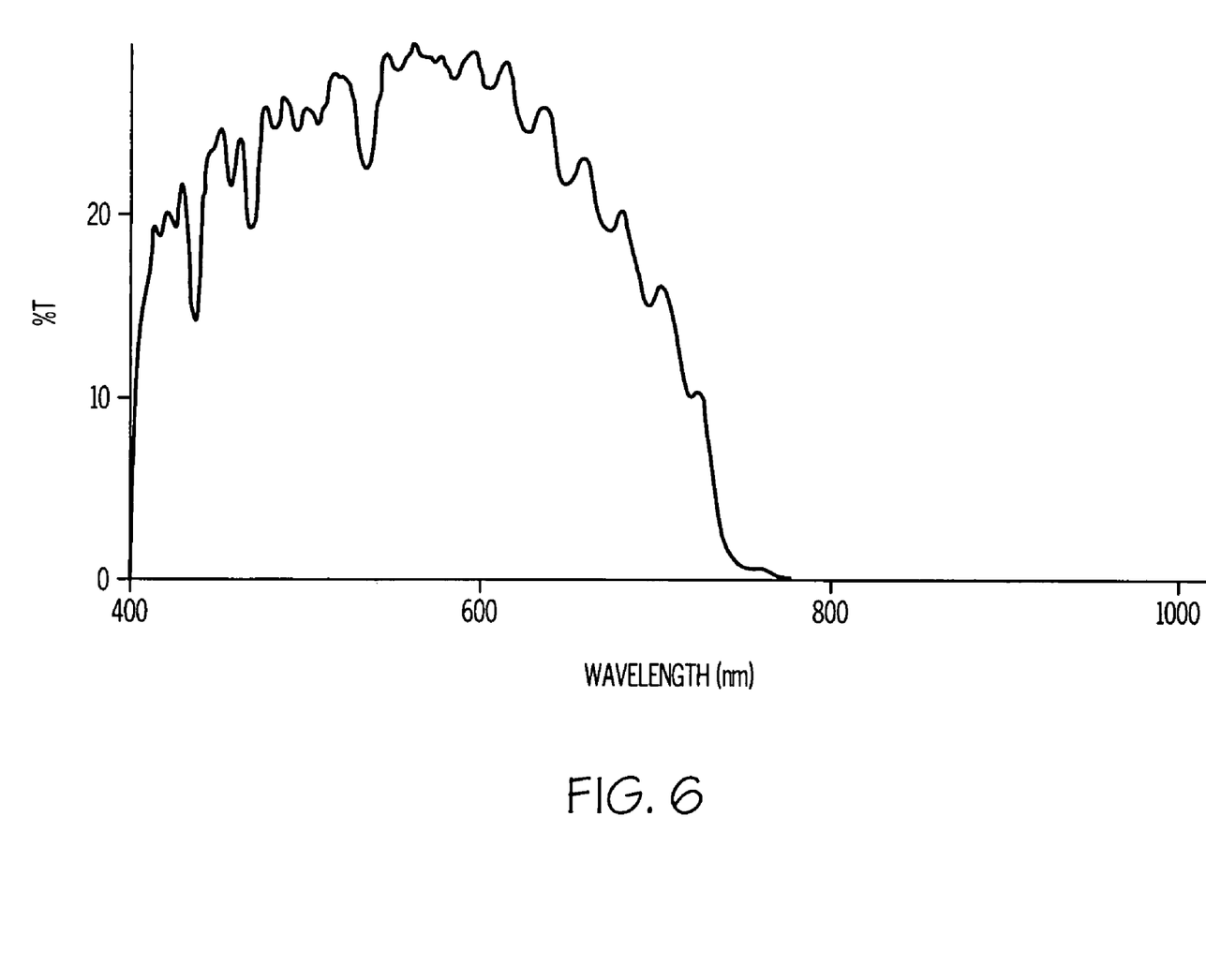
FIG. 6 is the UV-Visible Spectrum of thin films made from Epolin 4105 and Epolin 4138.

Another example of a filter for the light source can be prepared by building a multilayer structure UV hot mirror comprising two hot mirrors and an interference film. As illustrated in FIG. 6, this multilayer film can be very effective blocking the NIR light from the illumination source as well as allowing a near colorless visible light through as shown in the Visible-Near IR spectrum of the multilayer film. Similar filters can be built using mirrors from Navistar, and many other hot mirrors can be used in this type of filter.

In a system embodying aspects of the present invention, headlights of an automobile such as an ambulance, police car, or fire truck might be configured with NIR absorbing filters such that substantially only visible light is emitted while the near IR component is removed. Materials that substantially absorb infrared light while allowing for visible light to pass can include YAG laser filters and absorbing dyes. A headlight treated with these absorbing dyes might appear the same to the naked eye as an untreated headlight, but the treated headlight will not emit infrared light. Thus, with the use of an image receiver configured to detect infrared light, a user of the system can identify automobiles that are not ambulances, police cars, or fire trucks.

The foregoing description and examples have been set forth merely to illustrate the invention and are not intended as being limiting. Each of the disclosed aspects and embodiments of the present invention may be considered individually or in combination with other aspects, embodiments, and variations of the invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Furthermore, all references cited herein are incorporated by reference in their entirety.

What is claimed is:

1. A method of distinguishing a light source from among a plurality of light sources, the method comprising: emitting a set of wavelength bands from a first light source such that a first subset of the first light source's wavelength bands is blocked, as compared to a second light source;
   alternately filtering and not filtering received light such that a second subset of the first light source's wavelength bands is alternately blocked from reaching and allowed to reach a receiving device; and
   distinguishing the first light source from the second light source, based on the second subset of the first light source's wavelength bands being alternately blocked from reaching and allowed to reach the receiving device.

2. The method of claim 1, wherein emitting includes filtering the first subset of the first light source's wavelength's bands.

3. The method of claim 1, wherein at least one wavelength band is common to both the first subset of wavelength bands and the second subset of wavelength bands.

4. The method of claim 1, wherein the first subset of wavelength bands includes all non-visible wavelength bands.

5. The method of claim 1, wherein the receiving device is configured to detect light in the non-visible spectrum.

6. The method of claim 1, wherein the first subset of wavelength bands includes infrared wavelengths and the second subset of wavelength bands does not include infrared wavelengths.

7. The method of claim 1, wherein one or both of the first light source and the receiving device is mobile.

8. The method of claim 7, wherein one or both of the first light source and the receiving device is coupled to a vehicle.

9. The method of claim 1, wherein one or both of a wavelength and an intensity of the wavelength bands emitted by the first light source is modulated in synchrony with one or both of the receiving device and the filtering of the second subset of the first light source's wavelength bands.

10. A method of distinguishing a light source from among a plurality of light sources, the method comprising:
    alternately filtering and not filtering a set of wavelength bands emitted by a first light source, such that transmission of a first subset of the wavelength bands is alternately blocked and not blocked, as compared to a second, unfiltered light source;
    filtering received light such that a second subset of the transmitted wavelength bands is blocked from reaching a receiving device; and
    distinguishing the first light source from the second, unfiltered light source, based on the first subset of the transmitted wavelength bands being alternately blocked from reaching and allowed to reach the receiving device.

11. The method of claim 10, wherein at least one wavelength band is common to both the first subset of wavelength bands and the second subset of wavelength bands.

12. The method of claim 10, wherein the first subset of wavelength bands includes all non-visible wavelength bands.

13. The method of claim 10, wherein the receiving device is configured to detect light in the non-visible spectrum.

14. The method of claim 10, wherein the first subset of wavelength bands includes infrared wavelengths and the second subset of wavelength bands does not include infrared wavelengths.

15. The method of claim 10, wherein one or both of the first light source and the receiving device is mobile.

16. The method of claim 15, wherein one or both of the first light source and the receiving device is coupled to a vehicle.

17. The method of claim 10, wherein one or both of a wavelength and an intensity of the wavelength bands emitted by the first light source is modulated in synchrony with one or both of the receiving device and the filtering of the second subset of the first light source's wavelength bands.

18. A system comprising:
    a target light source configured to emit light at a set of wavelength bands;
    a receiving filter configured to block passage of a subset of the set of wavelength bands; and
    an image receiver configured to discriminate between the target light source and non-target light sources by alternately engaging and disengaging the receiving filter.

19. The system of claim 18, wherein the receiving filter is configured to allow passage of a wavelength band included in the set of wavelength bands but not in the subset.

20. The system of claim 18, further comprising a transmitting filter configured to block passage of a second subset of the set of wavelength bands, wherein the second subset and the subset blocked by the receiving filter are not identical.

21. The system of claim 20, wherein the transmitting filter is configured to allow passage of only visible light.

22. The system of claim 20, wherein the transmitting filter blocks infrared wavelengths and the receiving filter allows for the passage of infrared wavelengths.

23. The system of claim 20, wherein the transmitting filter is a surface treated with a material having a specific absorption spectrum.

24. The system of claim 20, wherein the transmitting filter is selected from a group consisting of: linear polarizers; circular polarizers; interference filters, including bandpass, long pass, short pass, hot mirrors, and cold mirrors; plasma filters; frequency selective surfaces; photonic band gap materials;

glass color filters; polymers containing dyes; polymers containing pigments; gels containing dyes; and gels containing pigments.

25. The system of claim 18, wherein the image receiver is configured to detect light in the non-visible spectrum.

26. The system of claim 18, wherein at least one of the target light source and the non-target light source is mobile.

27. The system of claim 26, wherein at least one of the target light source and the non-target light source is coupled to a vehicle.

28. The system of claim 18, wherein the receiving filter may be mechanically or electrically engaged by the image receiver.

* * * * *